April 25, 1933.  W. T. CRESPINEL ET AL  1,905,408
AUTO LIGHT CHECKING MEANS
Filed Sept. 16, 1931
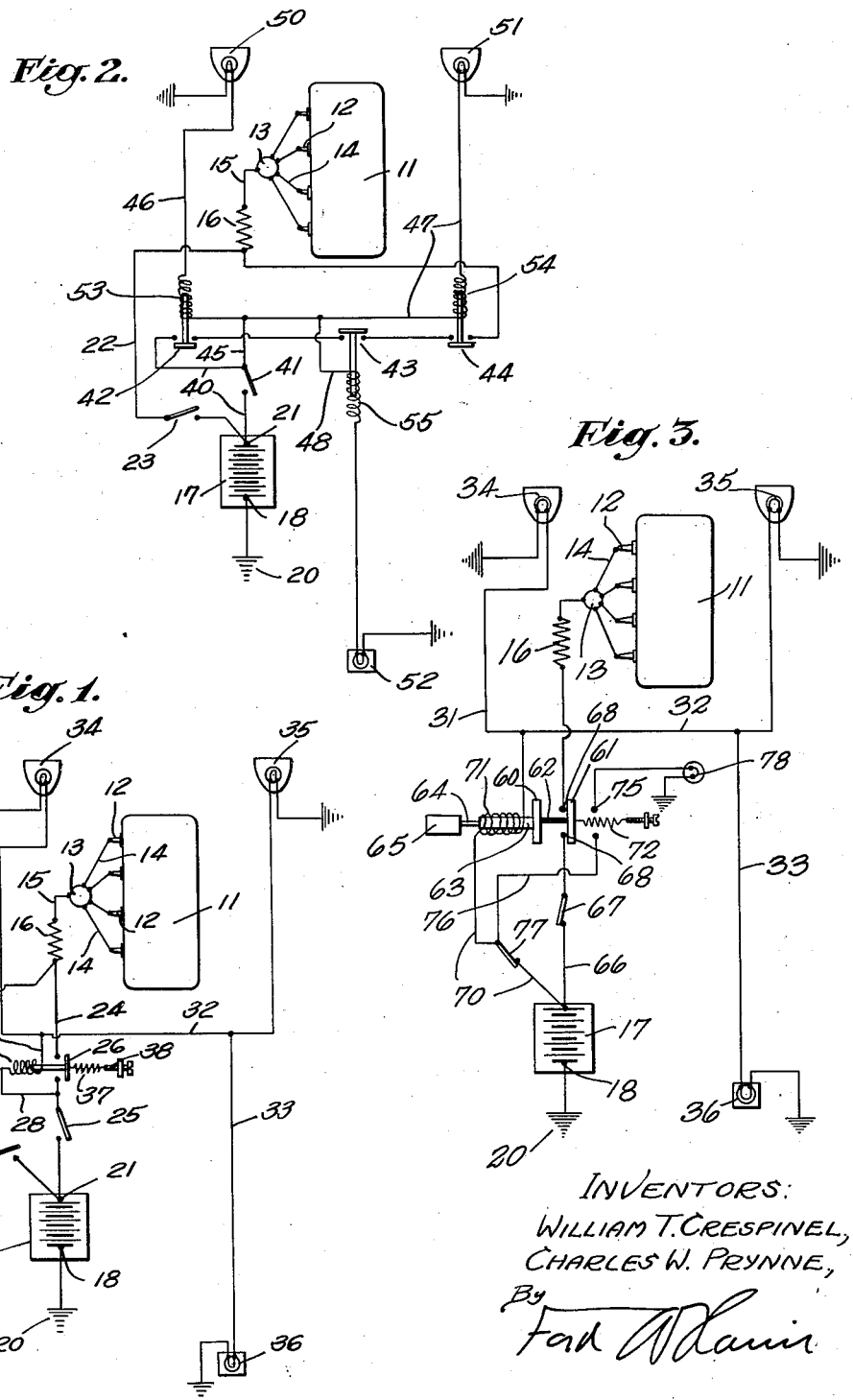
INVENTORS:
WILLIAM T. CRESPINEL,
CHARLES W. PRYNNE,
By
ATTORNEY.

Patented Apr. 25, 1933

1,905,408

UNITED STATES PATENT OFFICE

WILLIAM T. CRESPINEL AND CHARLES W. PRYNNE, OF LOS ANGELES, CALIFORNIA

AUTO LIGHT CHECKING MEANS

Application filed September 16, 1931. Serial No. 563,214.

Our invention relates to a device for bringing positively to the attention of a driver of an automotive vehicle that one of the lights of the vehicle is not burning.

Most of the states have laws making it a misdemeanor to operate an automobile at night without two headlights and a tail-light illuminated. Various means have been developed, such as a pilot light, for the intended purpose of advising the operator of an automobile that one of the required lights is not burning, but such means are not positive in their results for the reason that a light may be burned out or one of the light wires may be disconnected or broken so as to cause the pilot light or other indicating means to expose a signal, and such signal will remain unnoticed by the operator, and he will continue to drive illegally until stopped by a traffic officer.

It is an object of our present invention to provide in an automobile, means associated with the lighting system thereof for producing a change in the operation of the motor of the automobile when one of the lights is burned out or is not illuminated due to interruption of the portion of the circuit connected thereto, thereby bringing forcibly and positively to the attention of the operator of the automobile the fact that one of the lights is burned out so that he may immediately give the matter proper attention.

It is a further object of the invention to provide in a device such as set forth in the preceding paragraph a means whereby normal operation of the engine may be reassumed without rectifying the fault in the lighting system. In the preferred practice of our invention we provide a daytime ignition switch and a night-time ignition switch, the daytime ignition switch controlling a circuit leading directly from the battery or electric current source of the automobile to the transformer and distributing mechanism associated with the engine, and the night-time switch controlling a separate circuit leading to the ignition system of the engine, this second circuit having a switch adapted to be actuated by magnetic means controlled in turn by the lighting circuit of the automobile so that when there is a fault in the lighting circuit, the night-time ignition or driving circuit will, in consequence thereof, be interrupted so as to shut off the engine, thereby making it necessary for the operator of the automobile to do one of two things—first, to rectify the fault in the lighting circuit, or, second, to turn on the daytime ignition switch so as to close an ignition circuit which bridges or by-passes the magnetically controlled switch in the night-time ignition circuit, thereby making it possible to continue the operation of the automobile so that the operator may drive to a service station for replacement of a burned out globe or other necessary repair to the lighting system of the automobile.

A further object of the invention is to provide a device of the foregoing character having an indicator preferably in the form of a pilot light for indicating that the engine stoppage is due to a failure of the light circuit.

It is a further and important object of the invention to provide a means for automatically restarting the engine or reconnecting the ignition circuit after the engine has been temporarily stopped by a light circuit failure.

Further objects and advantages of the invention will be made evident throughout the following part of the specification.

Referring to the drawing, which is for illustrative purposes only,

Fig. 1 is an electrical diagram showing a preferred form of our invention in which a single magnetic switch is employed in the night-time ignition circuit.

Fig. 2 is an electrical diagram showing an alternative form of the invention in which a plurality of magnetic switches are employed.

Fig. 3 is an electrical diagram similar to Fig. 1 but showing another practice of the invention.

In Fig. 1, 11 indicates an internal combustion motor having spark plugs 12 which are connected to a distributor 13 by means of leads 14, and by means of a conductor 15 an ignition coil 16 is connected to the distributor. In the automobile containing the motor 11 there is a source of electric current, such as a battery 17 having a terminal 18 thereof grounded, as indicated at 20. The other terminal 21 of the battery is connected to the ignition coil 16 through a daytime ignition or driving circuit 22 having a customary ignition switch 23 therein. Therefore, if it is desired to operate the automobile in the daytime, the daytime ignition switch 23 is closed so as to electrically energize the ignition system of the engine and make possible the operation of the automobile in the ordinary manner. Extending also from the terminal 21 to the ignition coil 16 is a night-time ignition circuit 24 having therein a night-time ignition switch 25 and a magnetically operated switch 26. At a point between the switches 25 and 26 the electromagnet 27 of the magnetic switch 26 is connected by means of a conductor 28 to the night-time ignition circuit so that when the switch 25 is closed, current will also flow through the conductor 28, the electromagnet 27, a conductor 30, conductors 31, 32, and 33, headlights 34 and 35, and a tail-light 36.

When it is desired to operate the automobile at night, the night-time ignition switch 25 is closed, with the result that, if the lights 34, 35 and 36 are all burning, the flow of electric current through the electromagnet 27 will be sufficient to close the switch 26, thereby closing the night-time ignition circuit 24 and making it possible to operate the engine. Should any one of the lights 34, 35, or 36 burn out, or should any one of the conductors 31, 32, or 33 become broken or disconnected, the flow of electric current through the electromagnet 27 will be reduced, and a spring 37 extending between the switch 26 and an adjustment screw 38 will pull the switch 26 open, thereby interrupting the night-time ignition circuit 24 and stopping the engine 11. The operator of the automobile may then close the daytime ignition switch 23, and if the engine can be then started, he is aware that the stopping of the engine is caused by a fault in the lighting system. He may either rectify the fault in the lighting system or by use of the daytime ignition circuit 22 may drive to a service station to have such fault repaired.

In the alternative form of our invention shown in Fig. 2, in which all of the parts duplicating parts described in Fig. 1 have been given the same numbers, we provide a night-time ignition circuit 40 including a night-time ignition switch 41 and a plurality of auxiliary, magnetically operated ignition switches 42, 43, and 44. The closing of the night-time ignition switch 41 also produces a flow of electric energy through a conductor 45 which feeds individual lighting circuits 46, 47, and 48 which are respectively connected to lights 50, 51, and 52. In the respective circuits 46, 47, and 48 electromagnets 53, 54, and 55 of the respective auxiliary switches 42, 43, and 44 are included, so that when current is flowing through all of the circuits 46, 47, and 48, the electromagnets 53, 54, and 55 will be energized, and the switches 42, 43, and 44 will be held closed. Therefore, when the operator of a vehicle desires to drive at night, he closes the night-time switch 41 which results, if the lighting system is properly functioning, in turning on the lights and energizing the ignition system of the engine 11. Should any one of the lights 50, 51, or 52 burn out, or should the respective circuits 46, 47, and 48 connected therewith become interrupted, an associated switch 42, 43, or 44 will be opened in response to the energization of the electromagnet associated therewith, and the night-time ignition circuit 40 will be interrupted, stopping the engine 11. As described relative to Fig. 1, the daytime ignition switch 23 may be employed to close the daytime ignition circuit 22, or the fault in the lighting system may be immediately rectified.

In Fig. 3 we show our invention in a form similar to that shown in Fig. 1, with the exception that instead of the simple switch 26 shown in Fig. 1 we provide a switch member having contact members 60 and 61 secured together by an insulator 62. Extending from the contact member 60 is an armature 63 from which a bar 64 extends to a dash-pot 65 or other similar movement-controlling means. Extending from the battery 17 to the ignition coil 16 is a conductor 66 having a daytime ignition switch 67 therein and a pair of contacts 68 which are disposed between the contact members 60 and 61. Extending also from the battery 17 is a conductor 70 which feeds the lighting circuit consisting of the conductors 31, 32, and 33 and has therein an electromagnet 71 adapted to move the armature 63 leftwardly against the pull of a spring 72, thereby pulling the contact member 61 into engagement with the contacts 68 when all of the lights 34, 35, and 36 are burning, thereby closing the ignition circuit through the conductor 66, providing that the switch 67 is also closed. Should the lighting circuit fail in any manner, as by burning out of any one of the lights 34, 35, or 36, the armature 63 will be released and will move rightwardly, removing the contact member 61 from engagement with the contacts 68. The dash-pot 65 permits the contact members 60 and 61 to move rightwardly at a relatively low rate of speed, and from the time the contact member 61 has left the contacts 68 and the contact member 60 engages the contacts 68, the ignition circuit will be broken. If the engine is running in gear with the wheels of the vehicle, it will coast forwardly due to the momentum of the vehicle, but due to the fact that the engine is not firing, it will be clearly perceptible to the driver and he will be aware of the fact that there is a break in the ignition circuit. When the contact member 60 engages the contacts 68, the ignition will again be turned on and the engine will operate in the customary manner. Engagement of the contact member 60 with the contacts 68 is accompanied by engagement of the contact member 61 with contacts 75 in a conductor 76 which leads from a night-time switch 77 to a pilot light 78, thereby closing the circuit extending to the pilot light 78 and causing such pilot light to burn. The pilot light may be placed at a conspicuous point on the dashboard of the automobile so that it may be clearly viewed by the operator of the vehicle, thereby advising him that the cessation of the ignition of the automobile is caused by a failure of the light circuit.

In this practice of the invention the vehicle is not actually stopped by a failure in the light circuit, but the engine is stopped for a short time, say one to five seconds, and the proper operation thereof is resumed, this intermittent stoppage being accompanied by the lighting of the pilot light 78, thereby avoiding possibility of stalling the vehicle in traffic or on a railroad crossing.

Although we have herein shown and described our invention in simple and practical form, it is recognized that certain parts or elements thereof are representative of other parts, elements, or mechanisms which may be employed in substantially the same manner to accomplish substantially the same results; therefore, it is to be understood that the invention is not to be limited to the details disclosed herein but is to be accorded the full scope of the following claims.

We claim as our invention:

1. In a motor propelled vehicle, the combination of: a motor for propelling said vehicle; an electric circuit involved in the operation of said motor; lights on said vehicle; an electric circuit for energizing said lights; and electrically actuated means in said second circuit operated by a flow of electric current having a magnitude equalling the electric current consumption of all of said lights to close said first named circuit, said means opening said first named circuit when the flow of electric energy is reduced below said magnitude.

2. In a motor propelled vehicle, the combination of: a motor for propelling said vehicle; an electric circuit involved in the operation of said motor; lights on said vehicle; an electric circuit for energizing said lights; electrically actuated means in said second circuit operated by a flow of electric current having a magnitude equalling the electric current consumption of all of said lights to close said first named circuit, said means opening said first named circuit when the flow of electric energy is reduced below said magnitude; an auxiliary circuit for bridging said first named circuit; and switch means for closing said auxiliary circuit.

3. In a vehicle having an internal combustion motor for propulsion, the combination of: a daytime ignition circuit for said motor; a daytime switch for controlling said daytime circuit; a night-time ignition circuit for said motor; a night-time switch for said night-time circuit; a lighting circuit including light means; and an electrically actuated switch for controlling the flow of electric current through said night-time ignition circuit, said electrically actuated switch being connected in said lighting circuit and being adapted to close said night-time ignition circuit when the electric energy flowing in said lighting circuit is above a predetermined value.

4. In a vehicle having an internal combustion motor for propulsion, the combination of: a daytime ignition circuit for said motor; a daytime switch for controlling said daytime circuit; a night-time ignition circuit for said motor; a night-time switch for said night-time circuit; a lighting circuit including light means; and electrically actuated switch means for controlling the flow of electric current through said night-time ignition circuit, said electrically actuated switch means being connected in said lighting circuit and being adapted to close said night-time ignition circuit when the electric energy flowing in a selected part of said lighting circuit is above a predetermined value.

5. In a motor propelled vehicle, the combination of: a motor for propelling said vehicle; a source of electric energy; a light on said vehicle; an electric circuit connecting said light to said source of energy; and means for intermittently interrupting the operation of said motor in event of a failure in said circuit.

6. In a motor propelled vehicle, the combination of: a motor for propelling said vehicle; a source of electric energy; a light on said vehicle; an electric circuit connecting said light to said source of energy; means for stopping said motor in event of said circuit being interrupted; and means perceptible to the operator of the vehicle for indicating that the stopping of said motor resulted from a failure in said circuit.

7. In a motor propelled vehicle, the combination of: a motor for propelling said vehicle; a source of electric energy; a light on said vehicle; an electric circuit connecting said light to said source of energy; means for intermittently interrupting the operation of said motor in event of a failure in said circuit; and means perceptible to the operator of the vehicle for indicating that the stopping of said motor resulted from a failure in said circuit.

8. In a vehicle having an internal combustion motor for propulsion, the combination of: a daytime ignition circuit for said motor; a daytime switch for controlling said daytime circuit; a night-time ignition circuit for said motor; a night-time switch for said night-time circuit; a lighting circuit including light means; electrically actuated switch means for interrupting the flow of electric current through said night-time ignition circuit, said electrically actuated switch means being connected in said lighting circuit and being adapted to close said night-time ignition circuit when the electric energy flowing in a selected part of said lighting circuit is above a predetermined value; and means for reclosing said night-time ignition circuit after a prescribed period of time.

In testimony whereof, we have hereunto set our hands at Los Angeles, California, this 12th day of September, 1931.

WILLIAM T. CRESPINEL.
CHARLES W. PRYNNE.